May 11, 1965     N. STULBACH     3,183,033
ANTI-GLARE SHIELD FOR MOTOR VEHICLE WINDSHIELDS
Filed Aug. 13, 1962     4 Sheets-Sheet 1
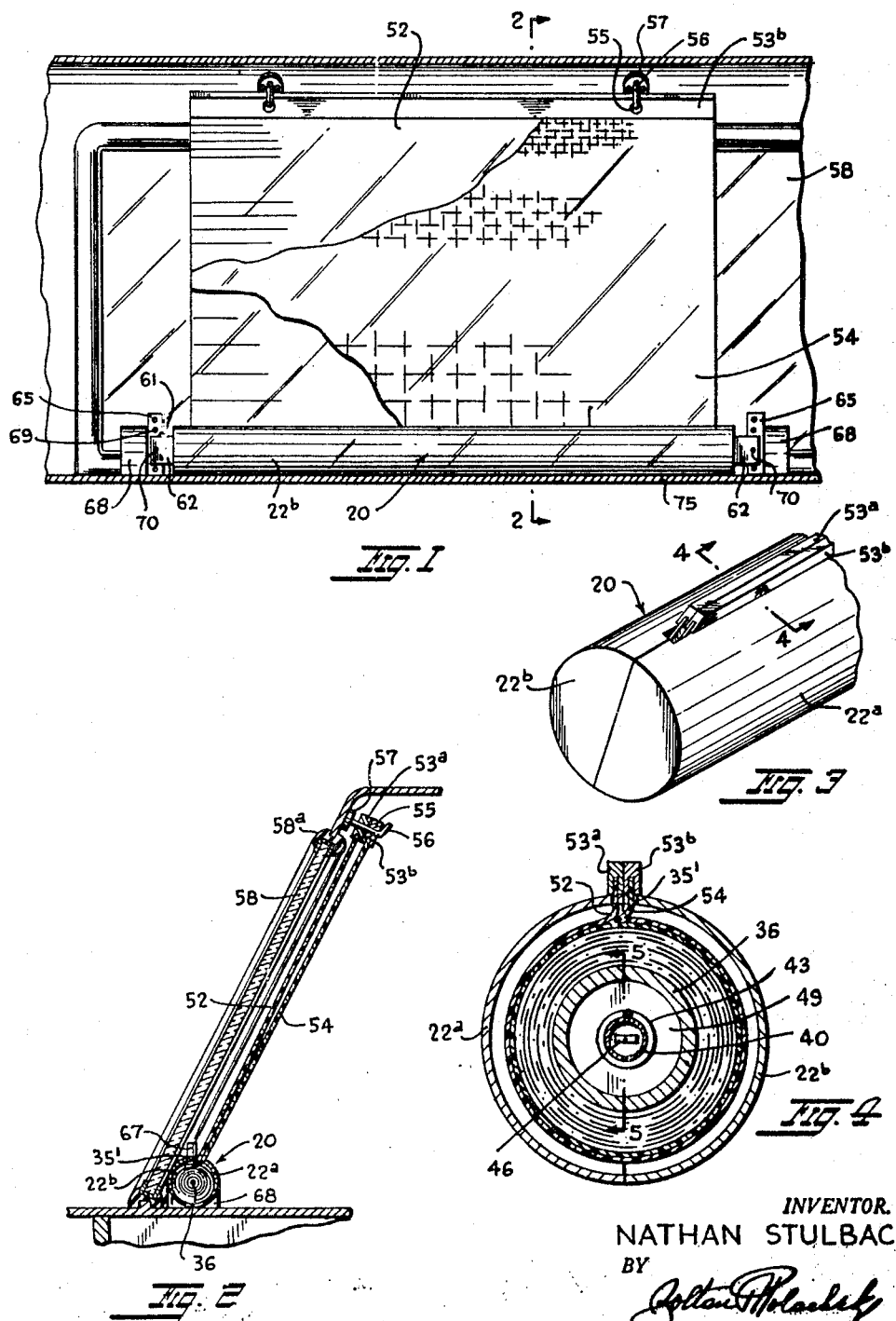
INVENTOR.
NATHAN STULBACH
BY
ATTORNEY

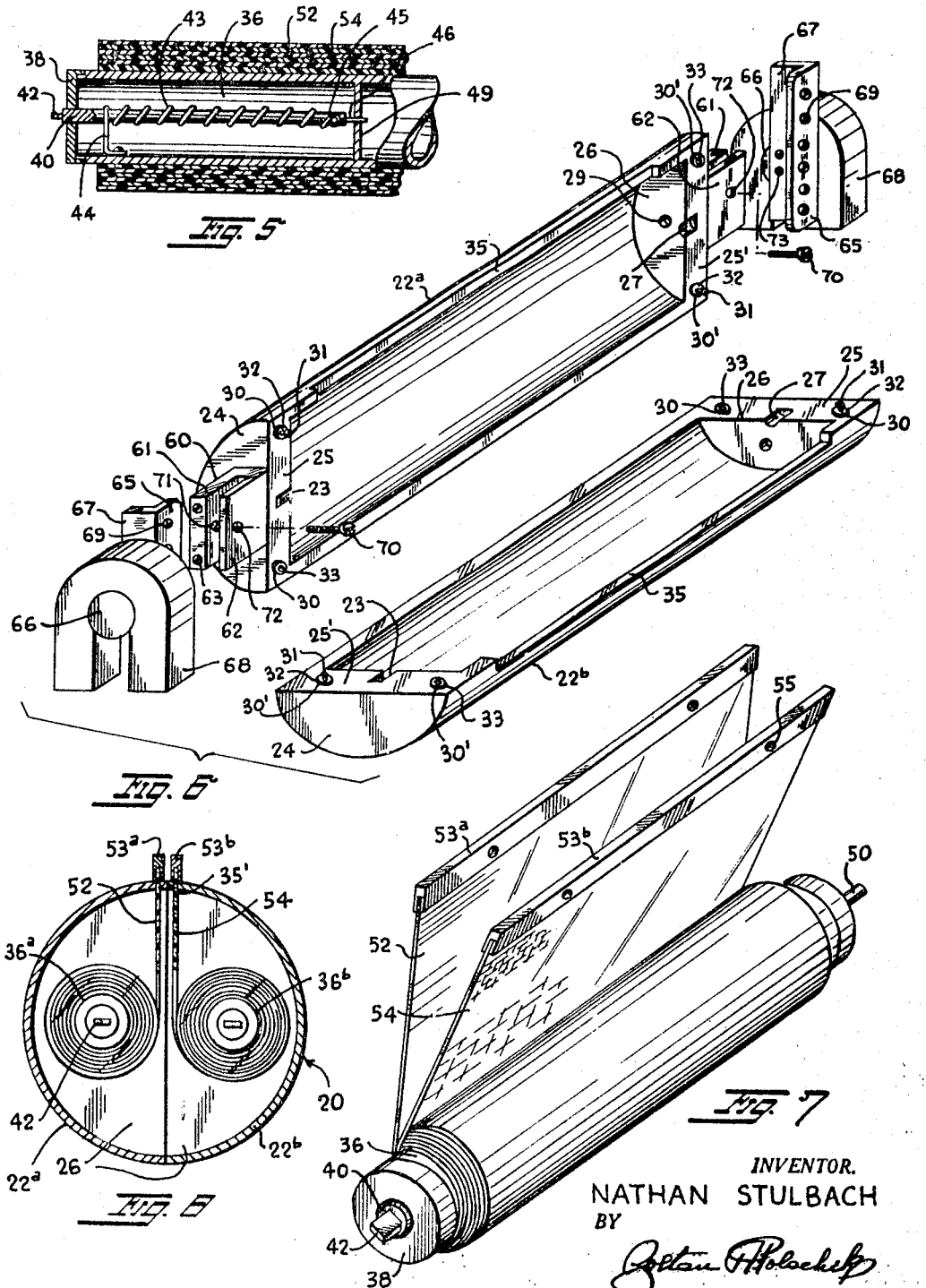

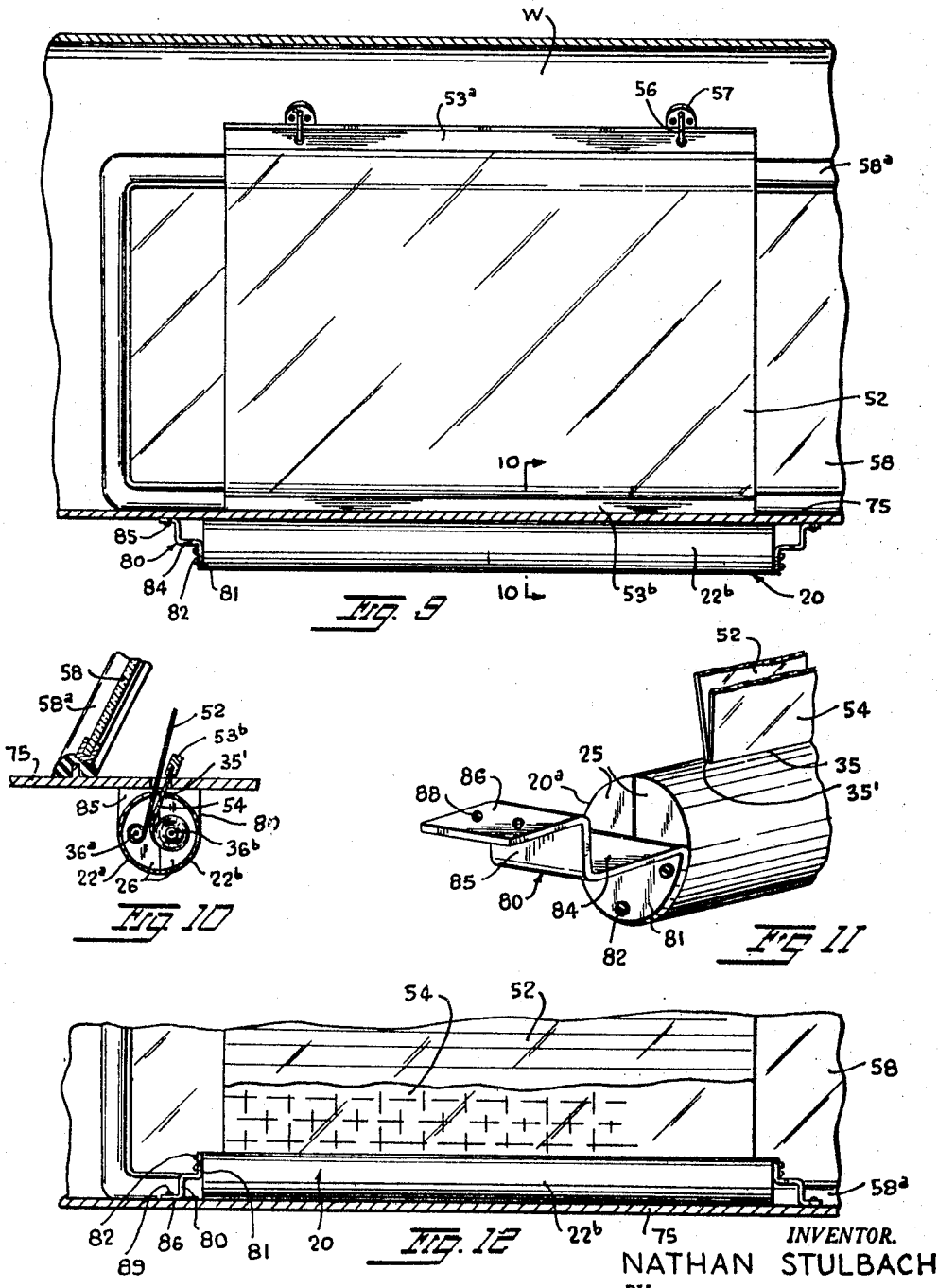

May 11, 1965  N. STULBACH  3,183,033
ANTI-GLARE SHIELD FOR MOTOR VEHICLE WINDSHIELDS
Filed Aug. 13, 1962  4 Sheets-Sheet 4

INVENTOR.
NATHAN STULBACH
BY
ATTORNEY

United States Patent Office 3,183,033
Patented May 11, 1965

3,183,033
ANTI-GLARE SHIELD FOR MOTOR
VEHICLE WINDSHIELDS
Nathan Stulbach, 284 Eastern Parkway,
Brooklyn 25, N.Y.
Filed Aug. 13, 1962, Ser. No. 216,586
3 Claims. (Cl. 296—97)

This invention relates to an anti-glare shield, shade or screen for automobiles, trucks, buses, boats, aircrafts and spacecrafts, etc.

According to the invention there is provided a cylindrical casing in which is a spring biased roller. On the roller is a transparent plastic shield, shade or screen which can be drawn upwardly out of a slot in the roller and secured above a windshield of a vehicle. The shield is preferably pigmented and is darker at its upper end with progressively lighter shades of pigmentation toward its bottom end. Two shields of different colors with progressively decreasing darkness of pigments from top toward the bottom may be wound on the same roller, or the two shields may be wound on two different spring biased rollers in the same casing. The casing may be removably and adjustably secured to a steel dashboard by magnets, brackets or the like. The casing may be mounted on top of a horizontal dashboard or may be mounted underneath the dashboard in a concealed position. The dashboard will then be provided with a slot through which the shield or shields can be withdrawn upwardly to cover the transparent windshield of the vehicle.

It is therefore a principal object of the invention to provide a pigmented shield, shade or screen for a windshield of a vehicle, with means for mounting a casing for the shield at the bottom of the windshield from which the shield can be drawn upwardly and secured above the windshield.

Another object is to provide a shield, shade or screen for a windshield of a vehicle, the shield including two colored transparent plastic sheets wound on the same or different rollers and housed in a casing mountable on top of or underneath a dashboard of the vehicle.

Another object is to provide a shield, shade or screen as described wherein the several pigmented transparent plastic sheets are differently pigmented and the pigments progressively decrease in intensity from top toward bottom of each sheet.

Another object is to provide a shield, shade or screen as described wherein the casing is adjustable and removable to a magnetic dashboard of the vehicle.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is front elevational view of a shield and casing assembly according to the invention, shown mounted to the rear of a windshield of a vehicle on the dashboard thereof, parts of one shield member being broken away.

FIG. 2 is a vertical sectional view taken on line 2—2 of FIG. 1.

FIG. 3 is a perspective view of part of the shield assembly of FIG. 1.

FIG. 4 is a cross sectional view on an enlarged scale taken on line 4—4 of FIG. 3.

FIG. 5 is a fragmentary sectional view on a further enlarged scale taken on line 5—5 of FIG. 4.

FIG. 6 is an exploded perspective view of parts of the casing and support brackets of the shield assembly.

FIG. 7 is a perspective view of an assembly of roller and shields.

FIG. 8 is a sectional view similar to FIG. 4 showing an arrangement of shield and dual rollers.

FIG. 9 is a front elevational view of a shield and casing assembly showing arrangement for mounting under the dashboard of a vehicle.

FIG. 10 is a fragmentary sectional view taken on line 10—10 of FIG. 9.

FIG. 11 is a fragmentary perspective view on an enlarged scale shield and casing assembly and a mounting bracket of FIGS. 9, 10.

FIG. 12 is a fragmentary front elevational view of the shield, casing and mounting brackets of FIGS. 9–11 showing a mounting arrangement on the top of the dashboard of the vehicle, parts being broken away.

Figure 13:
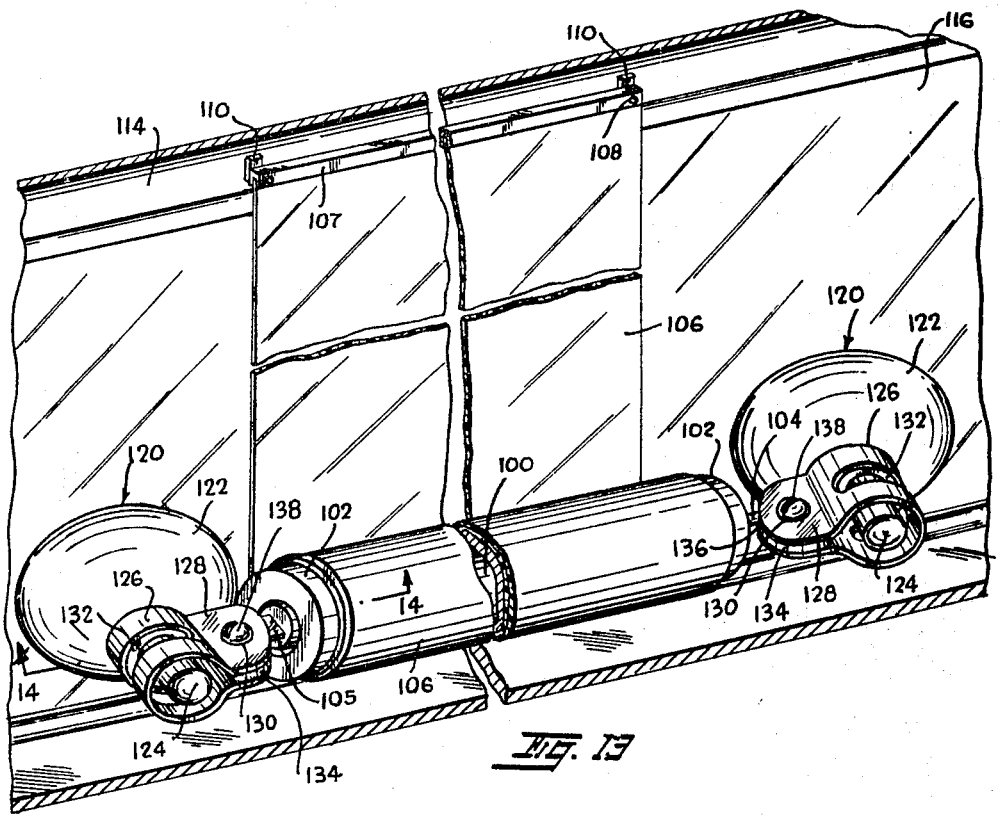
FIG. 13 is a view similar to FIG. 1 of another modification of the invention, parts being broken away.

Referring first to FIGS. 1–4 there is shown a cylindrical metal casing 20. This casing is formed of two identical semi-cylindrical half sections 22$^a$, and 22$^b$ formed of metal or plastic material. The sections have semi-circular opposite end walls 24, 26. Wall 24 is formed with a short notch or groove 23, which extends radially inward from flat diametral edge 25; see FIG. 6. The opposite end wall 26 is formed with centrally located cylindrical recess 27. These recesses 27 of both sections face each other when the two sections are assembled to form a round hole for a purpose to be described. Adjacent recesses 27 is a round hole 29. At opposite ends of edge 25 in each section are round recesses 30. Further similar recesses 30′ are formed at opposite ends of flat edge 25′ at the other end of each section. In recesses 30, 30′ of section 22$^a$ are set male snap fastener elements 32 having outwardly projecting studs 31. In recesses 30, 30′ of section 22$^b$ are set female fastener elements 33 having recesses which detachably engage studs 31 to hold the sections together and form a complete cylindrical casing. At upper sides of both sections, these recesses define a long rectangular slot 35′ at the upper side of the casing.

A hollow cylindrical roller 36 is removably mounted in the casing; see FIGS. 2, 4, 5, 7. This roller has an end cap 38 rotatably supporting one end of a rod 40. The rod has a flat stub 42 at its outer end. The rod carries a coil spring 43 secured at one end 44 to the inner wall of the roller. The other end 45 of the spring is secured to the rod. The other end 46 of the rod is rotatably carried by a partition 49 inside the roller. The roller has a round stud 50 at its other end. This stud fits rotatably in the round recess formed by cooperating semi-cylindrical recesses 27. Flat stud 42 engages nonrotatably in the cooperating notches 23. Thus the roller 36 can turn in the casing while the rod remains stationary. The coil spring biases the roller against rotation.

On the roller are wound two transparent plastic sheets 52, 54. Each sheet has a different color such as blue and yellow respectively as illustrated in FIGS. 1 and 7. The inner end of each sheet is secured to the roller. At the outer end of each sheet is a channel bar 53$^a$, 53$^b$ respectively. Spaced holes 55 are provided in the bars for attaching the bars horizontally to hooks 56 extending outwardly of brackets 57 provided on body wall W above the windshield 58 of the vehicle as shown in FIGS. 1 and 2. Attachment of the outer ends may also be accomplished by magnets or vacuum cups, cords, hooks and the like. The spring 43 serves to retract the plastic shields 52, 52 until the channel bars are stopped at edges of the slot 35' as clearly shown in FIGS. 3 and 4.

U-shaped brackets 60 are secured by screws 63 to opposite ends of section 22ª. Between sides 61, 62 of the brackets 60 are angle bracket plates 65 having sections 67 secured to non-magnetic inserts 66 by screws 73 of horseshoe magnets 68. The bracket plates have spaced holes 69 for receiving screws 70 which pass through aligned holes 71, 72 in the bracket sides 61, 63. The casing is thus adjustably positioned in the bracket plates and can be set a predetermined distance above the top of the horizontal dashboard 75 of the vehicle. In order to level uneven elevation on the dashboard, the magnets 68 will removably adhere to the dashboard if it is made of magnetic material such as steel.

The U-shaped brackets 60 may be molded together as one piece with part 22ª, especially when the casing is molded of plastic.

If the dashboard is not made of steel or if use of magnets is not desired, then vacuum-cups or brackets 80 such as shown in FIGS. 10–12 may be used to secure the casing to the top or bottom of the dashboard or to the lower portion of windshield.

Each bracket includes a semi-circular plate 81 secured by screws 82 to one end of the casing 20. The screws and plate hold the detachable sections 20ª, 20ᵇ of the casing together; see FIG. 11. A spacer plate 84 extends horizontally outward at the upper end of plate 81. A vertical plate portion 85 extends vertically at the outer end of plate 84 and an anchoring plate portion 86 extends outwardly of plate portion 85. Plate portion 86 has holes through which screws 89 can be inserted for securing the bracket to the underside of the dashboard as shown in FIGS. 9 and 10 or to the top of the dashboard as shown in FIG. 12. If the casing 20 is mounted at the underside of the dashboard, then the dashboard will be provided with a slot 90 through which anti-glare shields 52, 54 will be drawn, as shown in FIG. 10.

It will be noted that in FIGS. 8 and 10 is shown an alternate arrangement of the shields. The shields are wound on separate spring biased rollers 36ª, 36ᵇ instead of on the single roller 36 shown in FIGS. 4 and 7. The shields are wound on the rollers in opposite directions and pass outwardly of slot 35' in the same manner as when wound on a single roller. Each of rollers 36ª, 36ᵇ has a flat stud 42 at the end of rod 40 which engages in one of notches 23 at the inner side of casing section walls 25. At the other ends of the rollers are cylindrical pins or studs like stud 50 of roller 36. These studs fit into holes 29 in the walls 25' of the respective casing sections.

In both arrangements of the shields on a single and on two rollers, both shields can be drawn upwardly out of the casing and can both be secured to the brackets 57 on the body wall of the vehicle. In this position the light transmitted through both colored shields to the driver of the vehicle will be a blend of the two colors. For example, if one shield transmits predominantly blue light and the other shield transmits predominantly yellow light, the combined transmitted light rays will appear green. At different times of the day or at night only one of the colored shields may be required. The other shield can be left wound up on its own roller as shown in FIGS. 9 and 10, when two rollers are provided. If only a single roller 36 is provided the shield not needed can be wound up on its channel bar 53ª or 53ᵇ and placed on the top of dashboard while the other shield is extended upwardly behind the windshield 58.

The mounting of the casing at the bottom of the windshield is preferred to mounting at the top of the windshield. It will be noted that the windshield slopes forward. It is easier for the shields to be drawn upwardly and rearwardly. The sizes of windshields vary in different vehicles. With this in mind, it is desirable that the shades on the rollers, on the dashboard mounted shield, be long enough to cover the highest windshield.

Thus the shade having the densest pigments at its outer end will always reach the top of the windshield and provide the proper graduated pigment intensity on the upper portion of the windshield. However, should the shade be mounted from above, the densest pigmenting would have to be produced somewhere in the middle of the shade and in view of different sizes (heights) of windshields in various vehicles, there would be no assurance that the densest part of the shade will be properly positioned. Therefore, with anti-glare shields with pigments thereof decreasing in intensity from the outer ends thereof downwardly, the dashboard-mounting is more advantageous and desirable.

Also the dashboard provides more space for mounting the casing 20 than is available at the top of the windshield, above molding 58ª.

The progressively varying color pigment intensity of the several shields is most desirable since glaring sunlight, street lights and other elevated lights are most effectively excluded by the upper darker portions of the shields while the lower portions which receive little glare are lighter in tint or color and provide better view of the roadway to the driver.

The shield and casing assembly is arranged so that it can be quickly installed and removed. It can be placed at the driver's side of a vehicle or at a passenger's side. If desired, the dashboard can be formed with a well at the top into which the casing 20 can be inserted, so that the casing will be concealed and out of the way.

Figure 14:
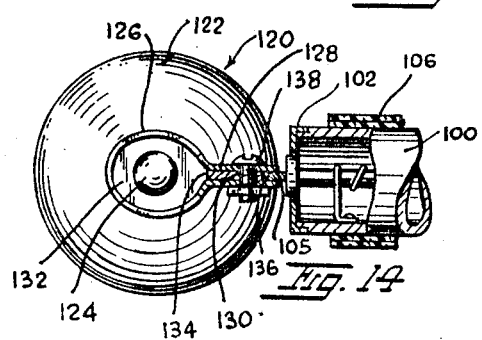
FIG. 14 is a sectional view taken on line 14—14 of FIG. 13.

Referring now to the modification of the invention shown in FIGS. 13 and 14, in FIG. 13 there is shown an ordinary window shade roller comprising a hollow wooden cylindrical casing 100 open at both ends and closed by flanged metal caps 102. An elongated round supporting stud 104 extends from one cap 102 and a spring pressed rollable flat stud 105 extends outwardly through an opening in the other cap 102 as is usual. A single shade 106 is wound around the casing 100. The outer free end of the shade carries a metal channel bar 107 with spaced holes 108 therein. Permanent magnets 110 are mounted on body wall 114 above the windshield 116 contacting the metal bar 107 to hold the shade up, of the vehicle. The shade is pigmented with the intensity thereof varying, being densest at the top and gradually decreasing. In accordance with this form of the invention, the roller 100 is releasably supported on the windshield above the dashboard, by the suction cup units 120, each unit comprising a rubber suction cup 122 having a cylindrical solid hub portion 124. A split metal bearing sleeve 126 embraces the hub portion 124 and is formed with radial closely spaced lugs 128 extending radially of the split edges thereof. The lugs are formed with aligned holes 130. An annular slot 132 is formed in the sleeve midway its ends. A metal washer 134 is interposed in the space between the lugs 128 and the washer is formed with a radial slot 136 extending from the inner periphery through the outer periphery of the washer. The radial slot 136 of one suction unit receives the flat lug 105 of the roller and the slot 136 of the other suction unit receives the elongated lug 104 of the roller. Screw and locking nut assemblies 138 extend through the aligned holes 130 in the lugs 128 fasten the suction cup units on the roller 100 with the cups 122 extending perpendicularly to the axis of the roller.

Figure 15:
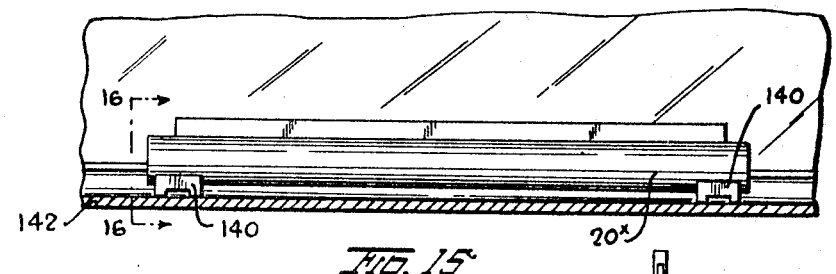
FIG. 15 is a view similar to FIG. 12 of another modified form of mounting arrangement on the top of the dashboard of the vehicle.
Figure 16:
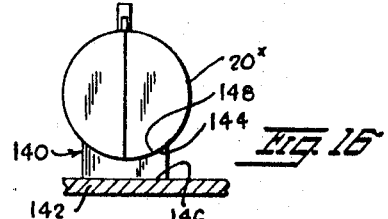
FIG. 16 is a view as seen from the left of line 16—16 of FIG. 15.

Still another modified form of mounting the casing 20ˣ on the top of the dashboard is shown in FIGS. 15 and 16. In this form, permanent magnets 140 are suitably mounted on the top of the dashboard 142 in spaced relation. Each magnet has a cylindrical solid body 144 with a flat bottom 146 and a dished upper surface 148. The metal casing 20ˣ seats in the dished upper surfaces of the magnets and is held by magnetism.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new and desire to secure by United States Letters Patent is:

1. An anti-glare shield assembly for a vehicle having an upright windshield and a horizontal dashboard adjacent to the windshield, said assembly comprising a cylindrical casing having two semi-cylindrical sections, means detachably securing the sections together, roller means rotatably disposed in said casing, said casing having a longitudinal slot therein, flexible transparent plastic shields wound on said roller means, and passing out of the casing through said slot for covering said windshield, means securing the outer ends of the shields to the vehicle adjacent the windshield, the width of the shields being substantially the length of the casing, and spring means biasing said roller means against unwinding, said shields being differently pigmented with the pigments of the shields increasing in intensity from outer free ends thereof downwardly toward the casing, and bracket means at opposite ends of the casing for securing the same to the vicinity of the dashboard, said bracket means including a pair of magnets, angle brackets secured to the magnets, and U shaped bracket members secured to opposite ends of the casing and adjustably secured to the angle brackets.

2. An anti-glare shield assembly for a vehicle having an upright windshield and a horizontal dashboard adjacent to the windshield, said assembly comprising a cylindrical casing having two semi-cylindrical sections, means detachably securing the sections together, roller means rotatably disposed in said casing, said casing having a longitudinal slot therein, flexible transparent plastic shields wound on said roller means, and passing out of the casing through said slot for covering said windshield, means securing the outer ends of the shields to the vehicle adjacent the windshield, the width of the shields being substantially the length of the casing, and spring means biasing said roller means against unwinding, said shields being differently pigmented with the pigments of the shields decreasing in intensity from outer free ends thereof downwardly toward the casing, and means at opposite ends of the casing for removably securing the same to the vicinity of the dashboard, said means including a pair of magnets, angle brackets secured to the magnets, and U-shaped bracket members secured to opposite ends of the casing and adjustably secured to the angle brackets, said roller means including a single roller with spring means in the roller to bias the same against unwinding.

3. An anti-glare shield assembly for a vehicle having an upright windshield and a horizontal dashboard adjacent to the windshield, said assembly comprising a cylindrical casing having two semi-cylindrical sections, means detachably securing the sections together, roller means rotatably disposed in said casing, said casing having a longitudinal slot therein, flexible transparent plastic shields wound on said roller means, and passing out of the casing through said slot for covering said windshield, means securing the outer ends of the shields to the vehicle adjacent the windshield, the width of the shields being substantially the length of the casing, and spring means biasing said roller means against unwinding, said shields being differently pigmented with the colors or neutral pigments of the shields decreasing in intensity from outer free ends thereof downwardly toward the casing, means at opposite ends of the casing for removably securing the same to the vicinity of the dashboard.

References Cited by the Examiner

UNITED STATES PATENTS

| | | | |
|---|---|---|---|
| 1,094,049 | 4/14 | Barnes | 296—84 |
| 1,442,255 | 1/23 | Doner | 160—121 |
| 1,526,346 | 3/25 | Kivikink | 296—97 |
| 1,621,972 | 3/27 | Darby | 296—97 X |
| 1,762,480 | 6/30 | Marenti | 296—97 |
| 1,913,961 | 6/33 | Shape | 296—97 |
| 2,086,092 | 7/37 | Pilon | 296—97 X |
| 2,306,086 | 12/42 | Smith | 160—121 |

FOREIGN PATENTS

| | | |
|---|---|---|
| 409,420 | 2/45 | Italy. |
| 490,031 | 1/54 | Italy. |
| 13,779/28 | 5/29 | Australia. |
| 71,696 | 7/59 | France. |
| 617,113 | 11/26 | France. |
| 777,341 | 11/34 | France. |

A. HARRY LEVY, *Primary Examiner.*